United States Patent [19]

Pflugbeil

[11] 3,984,184
[45] Oct. 5, 1976

[54] METHOD AND APPARATUS FOR DETERMINING THE SHARPNESS OF IMAGES

[75] Inventor: Mathias Pflugbeil, Baldham, Germany

[73] Assignee: AGFA-Gevaert, A.G., Leverkusen, Germany

[22] Filed: Aug. 6, 1975

[21] Appl. No.: 602,398

[30] Foreign Application Priority Data
Aug. 8, 1974 Germany............................ 2438105

[52] U.S. Cl..................................... 355/18; 355/41; 355/133; 356/203; 355/77
[51] Int. Cl.² ................... G03B 27/34; G03B 27/68
[58] Field of Search ................. 355/68, 133, 41, 18, 355/44, 38, 69, 71, 77; 354/25; 356/202, 203; 250/559

[56] References Cited
UNITED STATES PATENTS

| | | | |
|---|---|---|---|
| 2,641,158 | 6/1953 | Sweet | 250/559 X |
| 3,006,238 | 10/1961 | Eberline | 355/68 X |
| 3,017,515 | 1/1962 | Welch | 355/68 X |
| 3,347,131 | 10/1967 | Claver et al. | 250/559 X |
| 3,520,609 | 7/1970 | Lion | 356/203 X |
| 3,635,555 | 7/1972 | Kurahashi | 355/68 |
| 3,690,765 | 9/1972 | Rickard | 355/68 |
| 3,709,613 | 1/1973 | Zahn | 355/68 X |
| 3,734,611 | 5/1973 | Knapp et al. | 355/41 |
| 3,743,416 | 7/1973 | Widmer et al. | 355/68 |

Primary Examiner—L. T. Hix
Assistant Examiner—Douglas B. Farrow
Attorney, Agent, or Firm—Michael J. Striker

[57] ABSTRACT

The variation in transparency along the surface of an original is detected and a corresponding transparency-indicating signal is generated. The spectral components of the transparency-indicating signal having frequencies above a predetermined frequency associated with sharp images are integrated to form an integration signal corresponding to the time integral of these higher-frequency spectral components. The determination of whether the original bears an image whose sharpness warrants copying of the original is made by comparing the integration signal against a reference signal.

21 Claims, 3 Drawing Figures

METHOD AND APPARATUS FOR DETERMINING THE SHARPNESS OF IMAGES

BACKGROUND OF THE INVENTION

The invention relates to a method and apparatus for determining which of a plurality of originals to be copied bear images of a sharpness which warrants copying, particularly to a method and apparatus of such type making use of photoelectric scanning.

Commonly owned U.S. patent application Ser. No. 395,366 of Volker Weinert et al., filed Sept. 7, 1973, discloses a method of the type in question. With that method, the transparency values of adjoining portions of the original to be copied are measured, and the difference determined. A plurality of such differences are determined, and from the sum of such differences conclusions are drawn concerning the contrast in the image borne by the original to be copied. However, the performance of that method requires the use of at least two light detectors for forming the difference signals. This necessarily results in a relatively high cost for the matching of the two light measuring circuits to each other and does not particularly facilitate the measurement.

SUMMARY OF THE INVENTION

It is accordingly a general object of the invention to provide a method and apparatus such that a single light detector can be used for the assessment of the sharpness of the images on the originals to be copied.

This object, and others which will become more understandable from the description, below, of preferred embodiments, can be met, according to one advantageous concept of the invention, by detecting the variation in transparency along the surface of an original and generating a corresponding transparency-indicating signal, filtering out from the transparency-indicating signal the spectral components thereof having frequencies above a predetermined frequency associated with sharp images, generating from these high-frequency spectral components an integration signal corresponding to the time integral of these higher-frequency spectral components, and determining whether the original bears an image whose sharpness warrants copying of the orginal by comparing the value of the integration signal against a predetermined reference value.

The invention is based upon the recognition that the image content of a negative, or other original to be copied, can be expressed in terms of a measurable spectral distribution, or more precisely converted into a time-varying signal having a measurable spectral composition. The spectral distribution in question goes towards zero with increasing frequency, i.e., at the upper end of the spectral distribution. The smaller the resolving power of the emulsion bearing the image, the lower is the maximum frequency of the spectral distribution, i.e., the lower is the frequency at which the spectral distribution drops down to zero. If, for an emulsion having a given resolving power, the sharpness of the image borne thereon is extremely high, the top frequency of the spectral distribution of the image content will be that determined by the resolving power of the emulsion itself. If the image is of low sharpness, then the top frequency of the spectral distribution of the image content will be considerably below the frequency determined by the resolving power of the emulsion itself.

According to the concept of the invention, one determines whether or not a certain value of the lines-per-millimeter of the image content, usually encountered in the case of originals worth copying, is encountered in the image borne by the original being examined. It can be assumed that, in the case of amateur photographs, the top frequency of the spectral distribution of the image content will be limited only by the resolving power of the photographic emulsion itself, if the image is a sharp one. Because the spectral distribution of the image content can be ascertained using only a single light detector, it accordingly becomes possible to automatically evaluate image sharpness using only a single light detector.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
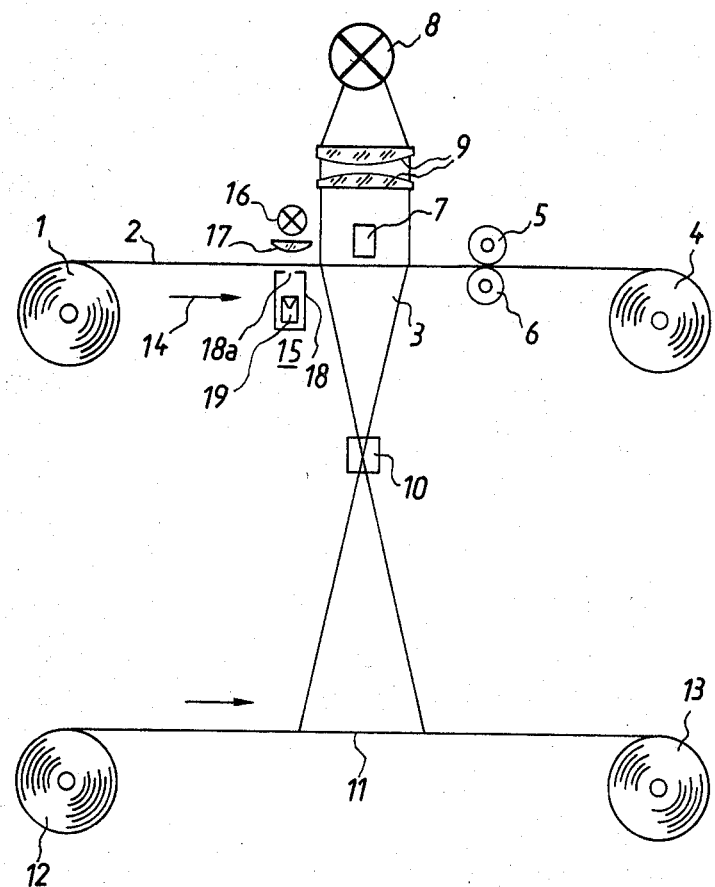
FIG. 1 schematically depicts a copying machine provided, upstream of the copying station, with a station for determining image sharpness.

FIG. 1 schematically depicts a copying set-up comprised of a supply reel 1, films glued or otherwise connected together end-to-end to form a long strip 2 of originals to be copied when passing by the copying window 3 of a copying station, and a take-up reel 4. The transport of the strip 2 is effected by means fo transport rollers 5, 6. An arrangement 7 detects notches in the edges of the orginals or holes associated with the respective originals, and starts and stops the transport rollers 5, 6 to effect the reguisite stepwise advancement of the strip 2, one original after another.

Located above the copying window 3 is a light source 8 and a condenser lens arrangement 9, for illuminating the original positioned at the copying window, so that the image on the original will be focussed by an objective 10 onto the light-sensitive copying material of the copying material strip 11. The copying material strip 11 is advanced stepwise in synchronism with the stepwise advance of the strip 2 of originals, travelling from a supply reel 12 to a take-up reel 13, and being advanced upon the completion of each exposure operation.

The film is transported in the direction of arrow 14. Upstream of the copying window 3, there is arranged a photoelectric scanning device 15. The scanning device 15 is used in the determination, for each original about to enter the copying station, of whether the image borne thereon is sharp enough to warrant copying of the original.

The scanning arrangement 15 includes a light source 16, which radiates light through a condenser 17 to illuminate the film 2 with substantially parallel rays of light. The light passing through the film enters through a scanning aperture 18a in a housing 18 for a photoelectric transducer 19. The scanning aperture 18a, at the upper side of the housing 18, facing the underside of the film, is a very narrow slit extending transverse to the transport direction of the film and having a length at least as great as the breadth of the film, but having a breadth, measured in the direction of film transport, of only about 0.01 mm.

It is assumed for the inventive evaluation of the signals of the light detector 19 that for the value $w$ of the lines-per-millimeter usually encountered in an aoriginal warranting copying, there is maintained the condition that $w$ is equal to $w_F$, the lower cut-off frequency of an electronic frequency filter, divided by $v$ the scanning speed. For example, if the film is transported with a constant speed of 50 cm/sec. then for a lines-per-millimeter having a value of 10 lines per millimeter, there is used for the filter $w_F$ a lower cut-off frequency of at least 5000 Hz. However, for electronic filters this is a very low value which is hard to realize physically. Higher values can be achieved only by increasing the transport speed, which in the case of a constant film transport can be realized in practice only with great difficulty, since the transport is brought to a stop and then resumed after the examination or copying of each negative.

Figure 2:
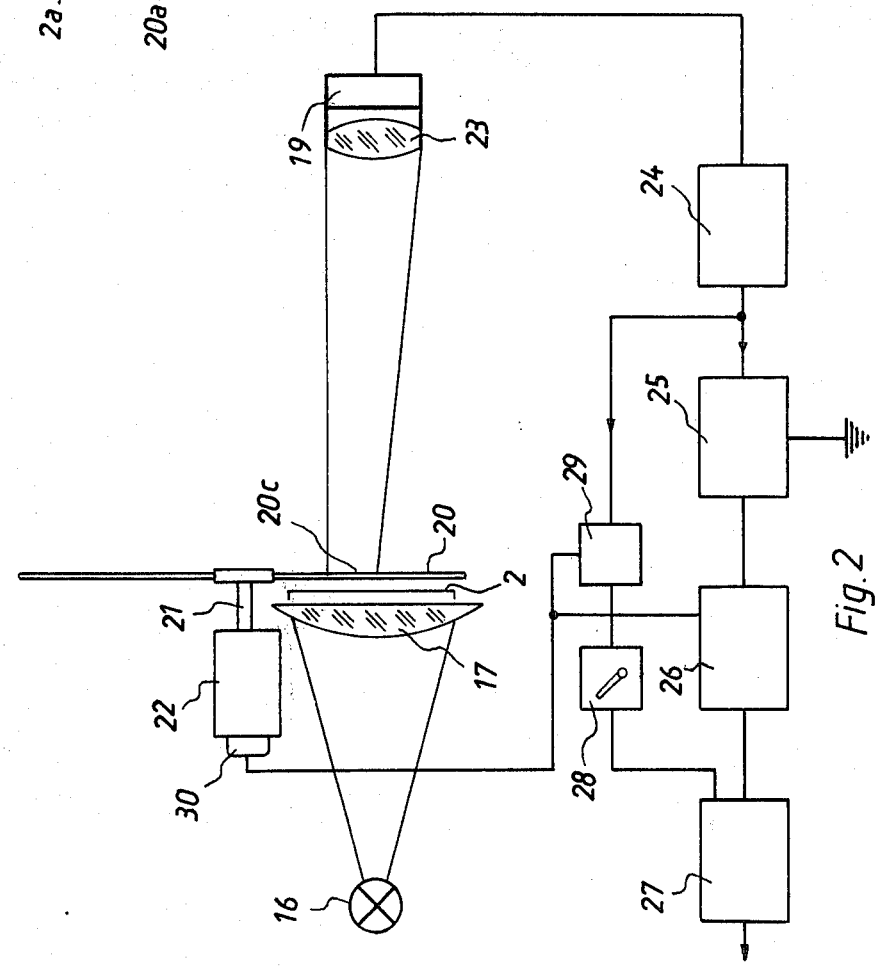
FIG. 2 schematically depicts one arrangement for determining image sharpness.

Accordingly, there is depicted in FIG. 2 another embodiment of the invention, according to which the scanning aperture is moved relative to the film with a very high relative speed, making it unimportant whether the film stands absolutely still during the scanning or moves relatively slowly, compared to the scanning speed.

Figure 3:
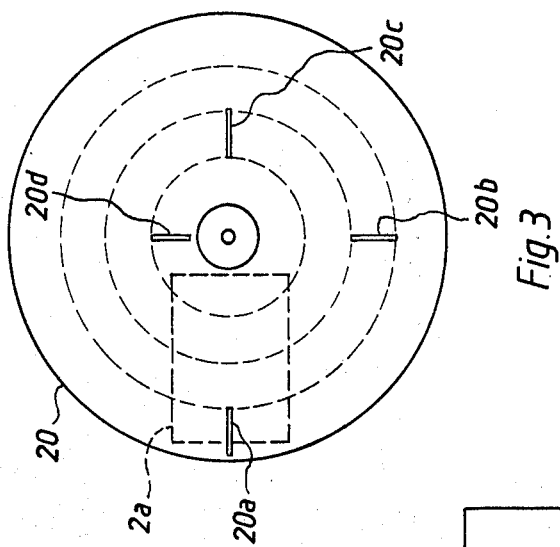
FIG. 3 shows in detail the aperture disk 20 of FIG. 2.

In FIG. 2, the light source for the scanning is again identified with numeral 16, and the condenser with numeral 17. The film 2 to be scanned is arranged directly behind the condenser. The scanning aperture is now provided in a rotating disk 20 arranged as close as possible to the film 2. The disk is circular, mounted on a shaft 21, and is turned constantly by a motor 22. The exact arrangement of the scanning apertures 20a, 20b, 20c, 20d, etc., on the disk 20 can be seen from FIG. 3, in which numeral 20a designates the shape and location of the negative being scanned. The scanning apertures 20a to 20d, each extending over only a part of the disk 20, extend radially, and are angularly offset from each other by 90°, and have a breadth of 0.01 mm. The length of each aperture in radial direction amounts to about one quarter of the breadth of the negative 2a. The radially extending apertures are so offset relative to each other that together, during the course of one rotation of the disk 20, they exactly cover the original 2a without intermediate gaps or overlapping. The light passing through the scanning apertures 20a to 20d of disk 20 is directed onto the photodetector 19 by a convergent lens 23. The photodetector 19 can be a secondary electron multiplier, which is particularly well suited for the intended use on account of its very high frequency limit. However, by appropriately selecting the requisite limit frequency, use could alternatively be made of semiconductor elements such as photoresistors or other photoelements.

Connected to the output of photodetector 19 is an amplifier 24 operative for amplifying without distortion the transparency-indicating signal, including those spectral components thereof having frequencies both above and below the limit frequency in question. Connected to the output of amplifier 24 is a filter 25. Filter 25 diverts to ground all those spectral components of the transparency-indicating signal having frequencies below the limit frequency corresponding to the lines-per-millimeter value $w$ associated with satisfactory image sharpness, and passes to the input of an integrating circuit 26 only those spectral components of the transparency-indicating signal having frequencies above the limit frequency in question. Alternatively, the filter 25 can be designed to pass only those spectral components of the transparency-indicating signal having a frequency within a passband defined by two sharply defined cut-off frequencies.

The output of the integrating circuit 26 is connected to one input of a comparator 27. Connected to the second input of comparator 27 is the output of a transducer 28 operative for furnishing a reference or comparison signal. The output signal of the comparator 27 is applied to the (non-illustrated) exposure control arrangement of the copying machine depicted in FIG. 1. A control signal generated at the output of comparator 27 causes (in a per se conventional manner) the exposure of the just-examined negative to be prevented and the film to be transported for the examination of the next negative.

In thusly evaluating the sharpness of the image on the original being examined, it may be desired to take into consideration the overall transparency of the negative. If so, the unfiltered output signal from amplifier 24, containing all the frequency components of the transparency-indicating signal derived from the original, can be applied to the input of a further integrating circuit 29. The output signal of circuit 29 accordingly will represent the average transparency of the original. This signal is applied to the input of the reference-signal transducer 28, advantageously a voltage-divider circuit, and from the output of transducer 28 is applied to the reference-signal input of comparator 27. In this way, the high-frequency component of the transparency-indicating signal must always have a certain relationship to the total transparency of the negative before a copying operation is permitted to be performed. In the case of dark or light negatives, the spectral component of the transparency-indicating signal above the threshold value must always be at least a certain fraction of the total spectral distribution of the transparency-indicating signal. What the exact percentage is to be can be selected by adjusting the setting of the adjustable voltage divider 28.

Advantageously, there is provided on the motor 22, for example on the shaft 21 on which is mounted the scanning disk 20, a synchronizer 30 which generates a synchronizing signal once per rotation of the disk when the disk assumes a predetermined angular position, or once per a predetermined plurality of rotations when the disk assumes a predetermined angular position. This synchronizing signal can be used to reset and activate the two integrating circuits 26, 29. For example, if the integrating circuits 26, 29 are conventional Miller integrators, with short-circuiting reset switches across their integrating capacitors, the synchronizing signals from synchronizer 30 can be operative for closing and then re-opening the resetting switches.

The arrangement operates in the following manner:

The transport arrangement 5, 6 moves an original 2a into the scanning range of the scanning disk 20, which is constantly rotated with a controlled speed. If the film strip 2 has come to a stop, the photodetector 19 transmits to the amplifier 24 all the information concerning the spectral distribution of transparency-indicating signal derived from the image on the original. This transparency-indicating signal is amplified, and then applied to the filter 25 and to the integration circuit 29. The filter 25 passes to the input of integration circuit 26 only those spectral components of the transparency-indicating signal having frequencies above the preselected frequency. Whenever the film strip 2 comes to a stop so that an individual negative can be scanned, the synchronizer 30 sets the two reset integrating circuits 26, 29 into operation for the duration of one rotation of the scanning disk 20, so that the integration of the filter and unfiltered signal will proceed for such duration.

By means of the voltage-divider-type reference-signal transducer 28, the integration signal from the integrating circuit 29 is divided down by the factor to which the transducer 28 is set, this factor being preselected based upon empirical determinations, of what the percentage relationship between the spectral component of the transparency-indicating signal above the preselected frequency and the total spectral distribution of the signal is for images having sharp negatives, for the type of film being processed. The comparator compares the two signals from the integration circuits 26, 29, and generates an output signal when the aforementioned higher-frequency part of the spectral distribution does not exceed the preselected percentage of the total spectral distribution. Such output signal blocks the commencement of the copying operation for the negative in question, and instead causes the transport means 5, 6, 7 to advance the film strip 2 by one negative. After the resetting of the two integration circuits 26, 29, the next original arrives in the scanning range of the scanning disk 20, and in the just-described way is scanned and examined to determine whether its image sharpness corresponds to the minimum requirements.

In this way, the copying of negatives bearing unsharp images, which otherwise would lead to the production of copies which must be discarded because unacceptable, is prevented with a very high degree of reliability. Likewise, the frequency analysis of the originals makes it possible to recognize with a very high degree of dependability which are acceptable, so that only these may be copied. This makes it possible to fully automate the copying machine, eliminating the need for the presence of a human operator or monitor at the machine, while simultaneously eliminating the production of large numbers of copies of unsharp images which must be subsequently discarded.

If the originals are to be scanned while they are in motion, for example by means of the photodetector 19 in FIG. 1 located in the housing 18 having the scanning aperture 18a, then the evaluation of the generated transparency-indicating signal can be performed in the same manner as just described with reference to FIG. 2.

Instead of providing one or more stationary or moving scanning apertures in the immediate vicinity of the film strip 2, it would alternatively be possible to project a scanning spot, for example through a scale-reducing focusing lens arrangement, i.e., for example using a flying-beam scanning procedure.

Furthermore, as another alternative, instead of the convergent lens 23 use could be made of a light guide funnel, or the like, which would capture substantially all the light passing through the scanning aperture and transmit such light onto the photodetector 19.

The transparency-indicating signal generated by the photodetector 19 can be evaluated in any of a variety of ways, for example by means of an analog computer completely formed of operational-amplifier circuits.

It will be understood that each of the elements described above, or two or more together, may also find a useful application in other types of circuits and constructions differing from the types described above.

While the invention has been illustrated and described as embodied in a copying device for processing long film strips, it is not intended to be limited to the details shown, since various modifications and structural changes may be made without departing in any way from the spirit of the present invention.

Furthermore, whereas the invention has been explained with reference to a transparency-indicating signal, it is to be understood that use could likewise be made of a signal indicative of light reflection or light absorption, if for example the original to be copied is not a transparent negative, but instead an opaque original.

without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of examining originals to be copied to determine whether the sharpness of the images they bear warrants the making of copies, comprising, in combination, the steps of detecting the variation in transparency along the surface of an original and generating a corresponding transparency-indicating signal; filtering out from the transparency-indicating signal the spectral components thereof having frequencies above a predetermined frequency associated with sharp images; generating from these higher-frequency spectral components an integration signal corresponding to the time integral of the higher-frequency spectral components; and determining whether the original bears an image whose sharpness warrants copying of the original by comparing the value of the integration signal against a predetermined reference value.

2. The method defined in claim 1, further including the step of copying the original but only if the integration value reaches the predetermined reference value.

3. The method defined in claim 1, wherein said step of detecting the transparency variation and generating the transparency-indicating signal comprises effecting relative movement between the original and a transparency detector along a predetermined path of motion using a transparency detector oriented to detect the transparency of an area on the original which measured in the direction of said path is small compared to the dimensions of the original.

4. The method defined in claim 3, wherein said effecting of relative movement comprises moving the original along the predetermined path past the transparency detector while maintaining the latter stationary.

5. The method defined in claim 3, wherein said effecting of relative movement comprises moving at least part of the transparency detector.

6. The method defined in claim 1, wherein said comparing of the value of the integration signal against a predetermined reference value comprises generating an average-transparency signal dependent upon the average transparency of the original, deriving from the average-transparency signal a reference signal having said reference value and comparing the integration signal against the reference signal.

7. The method defined in claim 6, wherein said predetermined frequency is that associated with an image sharpness corresponding to a resolution of approximately 10–15 lines per millimeter on the original.

8. An apparatus for examining originals to be copied to determine whether the sharpness of the images they bear warrants the making of copies, comprising, in combination, transparency-detecting means for detecting the variation in transparency along the surface on an original and operative for generating a corresponding electrical transparency-indicating signal; filtering means operative for receiving said transparency-indicating signal and passing only those spectral components thereof having frequencies above a predetermined frequency associated with sharp images; integrating means operative for generating an integration signal by forming the time integral of the components passed by said filtering means; and comparing means for determining whether the original bears an image whose sharpness warrants copying of the original by determining whether the value of the integration signal reaches a predetermined reference value associated with images of sufficient sharpness.

9. The apparatus defined in claim 8, further including copying means controlled by said comparing means and operative for copying the original if the value of the integration signal reaches the predetermined reference value.

10. The apparatus defined in claim 8, wherein said transparency-detecting means comprises a transparency detector and moving means for effecting relative motion between the original and said transparency detector along a predetermined path of motion, said transparency detector being operative for detecting the transparency of an area on the original which measured in the direction of said path of motion is small compared to the dimensions of the original.

11. The apparatus defined in claim 10, wherein said moving means comprises means for moving the original relative to said transparency detector along said predetermined path of motion.

12. The apparatus defined in claim 10, wherein said moving means comprises means for moving at least part of said transparency detector relative to the original along said predetermined path of motion.

13. The apparatus defined in claim 8, wherein said comparing means comprises means for automatically changing said reference value in dependence upon the average transparency of the original.

14. The apparatus defined in claim 8, wherein said comparing meens includes means for adjusting said reference value.

15. The apparatus defined in claim 8, wherein said comparing means comprises means for generating a reference signal having said reference value by forming the time integral of the unfiltered transparency-indicating signal.

16. The apparatus defined in claim 10, wherein said predetermined frequency is equal to approximately the ratio $w/v$, where $w$ is the image resolution expressed in lines per millimeter and $v$ is the speed of the relative motion effected by said moving means expressed in centimeters per second.

17. The apparatus defined in claim 16, wherein $w$ is equal to approximately 10–15 lines per millimeter.

18. The apparatus defined in claim 8, wherein said transparency-detecting means comprises a source of light for illuminating the original, a photodetector for receiving light transmitted from the illuminated original, and a rotating scanning disk in the path of the light impinging upon said photodetector, said scanning disk being provided with a plurality of radially extending scanning slits individually passing over different respective regions of the original being scanned and together passing over substantially the entire original.

19. The apparatus defined in claim 18, wherein said integrating means further includes synchronizing means coupled to said scanning disk and operative for resetting and restarting said integrating means in synchronism with the rotation of said scanning disk.

20. The apparatus defined in claim 18, wherein the breadth of said scanning apertures is approximately 0.01 mm.

21. The apparatus defined in claim 8, wherein said transparency-detecting means comprises means for projecting a scanning aperture onto the original.

* * * * *